United States Patent [19]

Feitzinger et al.

[11] Patent Number: 4,512,654

[45] Date of Patent: Apr. 23, 1985

[54] CONTROLLING AMMONIA EMISSIONS FOR DIAZO DEVELOPING EQUIPMENT

[75] Inventors: Eduard Feitzinger, Vestal; Robert B. Seminski, Endwell, both of N.Y.

[73] Assignee: R.Q.O. Holding Company, Jamestown, N.Y.

[21] Appl. No.: 534,095

[22] Filed: Sep. 20, 1983

[51] Int. Cl.[3] ........................ G03D 7/00; G03B 27/30

[52] U.S. Cl. ........................................ 355/27; 354/300

[58] Field of Search ............................ 354/300; 355/27

[56] References Cited

U.S. PATENT DOCUMENTS 3,900,862 8/1975 Bennett et al. ........................ 354/300

4,449,815 5/1984 Staffan ........................... 354/300 X

*Primary Examiner*—Donald A. Griffin

*Attorney, Agent, or Firm*—Kane, Dalsimer, Kane, Sullivan and Kurucz

[57] ABSTRACT

An improved developing apparatus for diazo-type photocopy machines, which is adapted to prevent external leakage of gaseous ammonia developing medium to the surrounding environment is provided. The apparatus comprises a developing chamber having transport means for advancing exposed diazo-type sensitized paper therethrough, means for introducing and circulating gaseous ammonia within the chamber to develop an image on the sensitized paper; and a vacuum pump for evacuating said ammonia from the developing chamber. As an additional feature of the invention, vacuum surge means are provided to maintain the below atmospheric pressure within the developing chamber at a relatively constant level to ensure uniform development of the sensitized paper.

15 Claims, 3 Drawing Figures

CONTROLLING AMMONIA EMISSIONS FOR DIAZO DEVELOPING EQUIPMENT

BACKGROUND OF THE INVENTION

Field of the Invention

The invention relates to apparatus for developing diazo prints with ammonia fumes and more particularly relates to improvements in the control of ammonia fume emissions from such apparatus.

BRIEF DESCRIPTION OF THE INVENTION

Representative of prior art descriptions in the literature is that found in the U.S. Pat. No. 3,900,862.

The U.S. Pat. No. 3,900,862 describes improved developing apparatus for the development of diazo process prints. In general, the apparatus comprises a developing chamber having an inlet for receiving liquid or gaseous developing medium, an outlet for discharging such developing medium, and means for transporting sensitized paper therethrough in the line of flow from the inlet to the outlet, means for introducing liquid or gaseous developing medium into the developing chambers in controlled amounts via said inlet and a vacuum pump in communication with said outlet to remove the developing medium from the developing chamber, said vacuum pump may be adapted to pump a greater volume of liquid or gaseous developing medium from said developing chamber than is introduced thereto, to maintain the internal pressure of said developing chamber at below atmospheric, and thereby avoid external leakage of developing medium.

The developing chamber can be constructed in any desired configuration well known in the photocopy machine art. Such configurations include a straight-through or elongated chamber, in which sensitized paper to be developed is transported along a straight line path by means of a series of cooperating rollers. Chambers formed in this configuration have an inlet for the sensitized paper at one end, defined by a pair of such rollers having a nip therebetween through which the sensitized paper passes, and a corresponding outlet at the other end of the chamber, similarly defined by a pair of rollers having a nip therebetween through which the paper passes. The developing chamber can also be of the circular path type, wherein a rotatable cylindrical drum having a fixed perforated sleeve mounted therearound is disposed within an enclosed chamber having a single opening for both the entrance and exit of the sensitized paper. In this configuration sensitized paper is transported into the opening by means of a series of cooperating rollers, and is then advanced in a circular path through the developing chamber by means of the rotatable drum via an annular space defined by the drum and the sleeve. A doctor blade provided adjacent said drum separates the developed sensitized paper therefrom, and permits its exit via the same opening through which it entered.

The means for introducing ammonia into the developing chamber is preferably a circulating system comprising a closed reservoir containing the ammonia, and a pump for circulating the ammonia between the reservoir and the developing chamber. The reservoir includes an outlet connected directly to the inlet of the developing chamber to feed ammonia therein, and an inlet connected to the positive pressure side of the pump. The negative pressure or suction side of the pump is connected to a second outlet provided in the developing chamber. It should be noted that the ammonia circulating pump is preferably separate and apart from the vacuum pump referred to hereinabove, and that each pump is connected at its suction side to a different outlet from the developing chamber. However, it should also be noted that both pumps can be driven by a single electric motor common to both.

In the preferred embodiment, the developing medium is anhydrous ammonia and the reservoir contains a solution of aqueous ammonia and gaseous anhydrous ammonia disposed thereabove. The positive pressure side of the ammonia circulating pump is in communication with the reservoir at a point below the surface of the aqueous ammonia, so that gaseous ammonia, together with any air drawn into the developing chamber, is bubbled through the aqueous ammonia to facilitate its dissolution, and thereby generate additional quantities of gaseous anhydrous ammonia. In addition, the reservoir outlet is disposed at or adjacent the top thereby and the pressurized mixture of air and anhydrous ammonia entering the reservoir raises the internal pressure within the reservoir a sufficient amount to pump the anhydrous ammonia from the top of the reservoir above the aqueous ammonia into the developing chamber.

Vacuum surge means are provided to maintain a relatively constant below atmospheric pressure within the developing chamber. In the preferred embodiment, such means comprises a vacuum surge chamber disposed in the line of flow from the primary outlet of the developing chamber to the suction side of the vacuum pump, and consists of a sealed cylindrical tank having an inlet in communication with the outlet of the developing chamber, an outlet in communication with the suction side of the vacuum pump. The valve is responsive to the below atmospheric internal pressure of said tank to open when such internal pressure is reduced below a predetermined value, thereby permitting the entry of ambient air to modulate and maintain the internal pressure of the tank at the desired level.

It has been found under test conditions that a subatmospheric pressure in the range of about 0.2 inches of water column to about 1.0 inches of water column yields extremely good results in both the prevention of external leakage from the developing chamber and the maintenance of good quality photocopy prints.

The gaseous ammonia exhausted from the developing chamber and/or the vacuum surge chamber by the vacuum pump can be vented to the exterior of the building in which the photocopy machine is utilized in a conventional manner by means of suitable duct work, or in the alternative, can be neutralized by passing such ammonia through a suitable absorbent material, such as citric acid. For such purpose, an absorption vessel containing the absorbent material is formed as part of the photocopy machine and suitable tubing is provided from the vacuum pump to such reservoir, in a manner such that the ammonia may be bubbled through the absorbent to accomplish complete neutralization thereof. As a still further alternative, the outlet of the vacuum pump can be connected to a catalytic converter for the breakdown of the ammonia to its component constituents of nitrogen gas and water vapor.

We have found the above-described apparatus to be advantageous in that it satisfactorily reduces and even eliminates the emission of ammonia fumes under standard operating conditions. However, we have also discovered that the efficiency of the reduction or elimination of the developer fumes can be greatly enhanced by adding an additional collection chamber adjacent to the means for transporting the sensitized paper through the development chamber.

SUMMARY OF THE INVENTION

The invention comprises, in a developing apparatus for photocopy machines comprising, in combination, a developing chamber having an inlet for receiving developing medium, an outlet for discharging said developing medium, means for transporting sensitized paper through the developing chamber and a vacuum pump in communication with the developing chamber to the pressure within the developing chamber, to a level below ambient pressure, and thereby avoid external leakage of developing medium, the improvement which comprises;

a sealed fume collection chamber positioned adjacent to and in open contact with the means for transporting the sensitized paper; and open conduit means connecting the sealed chamber to evacuate collected fumes.

DETAILED DESCRIPTION OF THE PREFERRED EMBODIMENTS OF THE INVENTION

Figure 1:
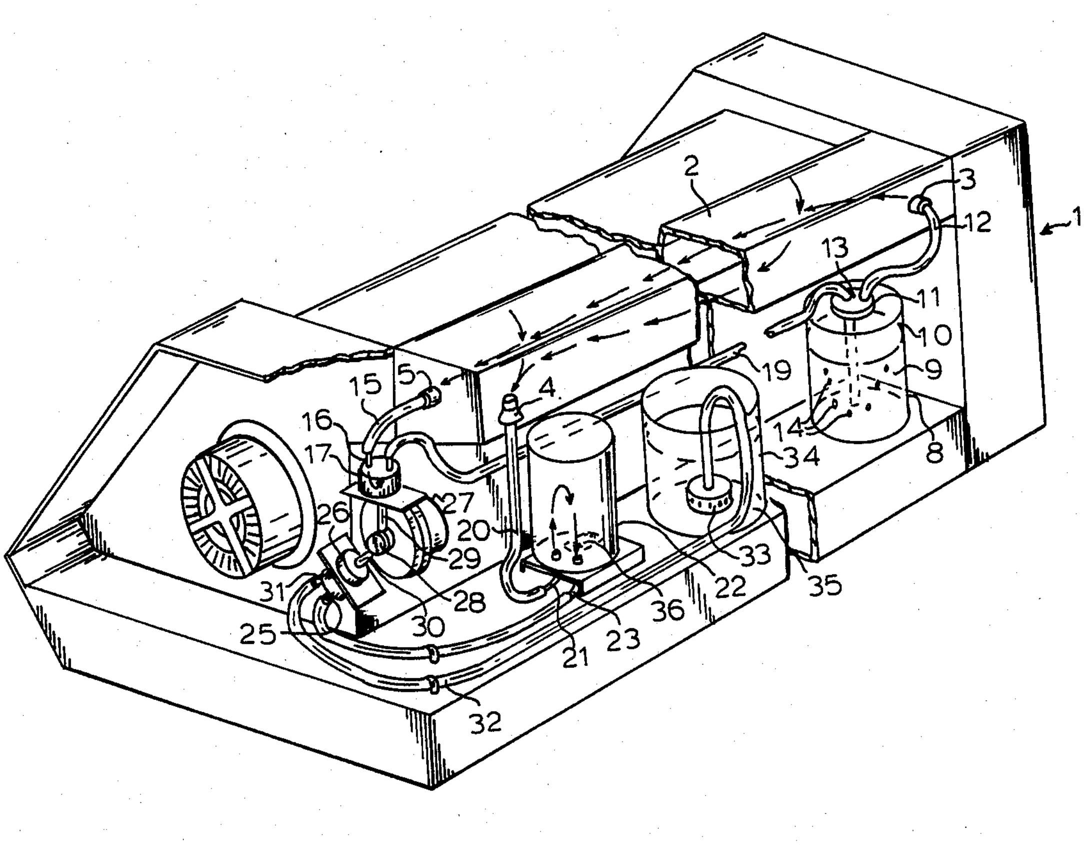
FIG. 1 is a rear perspective view of a photocopying machine embodying the developing apparatus of the invention.

Referring now to FIG. 1, a diazo-type photocopy machine 1 is provided with a sub-atmospheric developing apparatus. Such developing apparatus comprises a developing chamber 2 having an inlet 3 for receiving gaseous ammonia, a first outlet 4 and a second outlet 5, both adapted to discharge a mixture of ammonia and air therefrom. As shown schematically in FIG. 2, developing chamber 2 includes a rotatable cylindrical drum 6 for transporting sensitized diazo-type paper material 42 therethrough in a manner such that the paper is contacted by the ammonia introduced into the developing chamber to develop the latent image thereon. A fixed perforated cylindrical sleeve 7 is disposed in a spaced apart position around drum 6 to define an annular space for the paper and guide the same through the developing chamber. The perforations in sleeve 7 permit the ammonia developing medium to fully contact the sensitized paper during the development process.

A reservoir 8 containing a solution of aqueous ammonia 9 and gaseous anhydrous ammonia 10 disposed above such aqueous ammonia is mounted at the rear of photocopy machine 1. Reservoir 8 includes an outlet 11 at the top thereof connected to inlet 3 of the developing chamber by means of flexible tubing 12, and an inlet 13 having a tubular portion 14 extending into the reservoir to a point below the surface of the aqueous ammonia 9. Outlet 5 of the developing chamber 2 is connected by means of flexible tubing 15 to the suction side of a piston pump 17 via pump inlet 16, and the pressure outlet 18 of pump 17 is connected by means of flexible tubing 19 to the inlet 13 of reservoir 8. In this manner, gaseous anhydrous ammonia is circulated by means of pump 17 to and from reservoir 8 via developing chamber 2. Since tubular extension 14 communicates with reservoir 8 at a point below the surface of the aqueous ammonia 9, the gaseous ammonia, together with any air drawn into the system, which is pumped from the developing chamber 2 by means of pump 17 is bubbled through such aqueous ammonia. This serves to facilitate the dissolution of the aqueous ammonia to generate additional quantities of anhydrous ammonia to be circulated through the developing chamber, and in addition, pressurizes reservoir 8 to a sufficient degree above that of the developing chamber, so that, due to the differential pressure between the reservoir 8 and the developing chamber 2, the anhydrous ammonia within the reservoir 8 will flow into developing chamber 2.

The outlet 4 of developing chamber 2 is connected by means of flexible tubing 20 to the inlet 21 of a vacuum surge chamber 22. An outlet 23 of the surge chamber 22 is in turn connected by means of flexible tubing 24 to the suction side inlet 25 of a vacuum pump 26. It should be noted at this point that both pumps 17 and 26 are operatively driven by means of a single electric drive motor 27. Motor 27 has a drive shaft 28, which includes a pair of eccentrically driven piston rods 29 and 30, which rods are connected to pumps 17 and 26, respectively. It should also be noted that vacuum pump 26 may be capable of pumping a greater volume of gas out of the developing chamber than is circulated by pump 17. The outlet 31 of vacuum pump 26 is connected via flexible tubing 32 to a perforated gas distributor 33, which is disposed within an open top absorption vessel 34 and below the surface of a citric acid solution 35 in such vessel for the absorption of ammonia gas discharged by pump 26.

Figure 3:
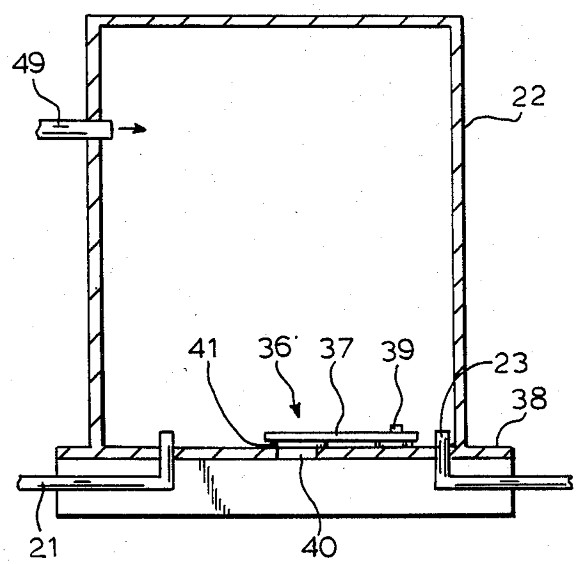
FIG. 3 is a cross-sectional view of the vacuum surge chamber shown in FIG. 1.

The vacuum surge chamber 22 includes a normally closed control valve 36 mounted on the bottom thereof and in communication with the exterior ambient atmosphere. As shown in FIG. 3, control valve 36 comprises a flexible springlike plate 37 fixedly attached to the base member 38 of vacuum chamber 22 by means of a pair of screws 39. Base number 38 includes a circular opening 40 communicating the interior of chamber 22 and the exterior thereof, and a resilient disc 41 formed of rubber material or the like is fixedly attached to the bottom of plate 37 and is biased by such plate into a position to fully cover and seal opening 40.

Figure 2:
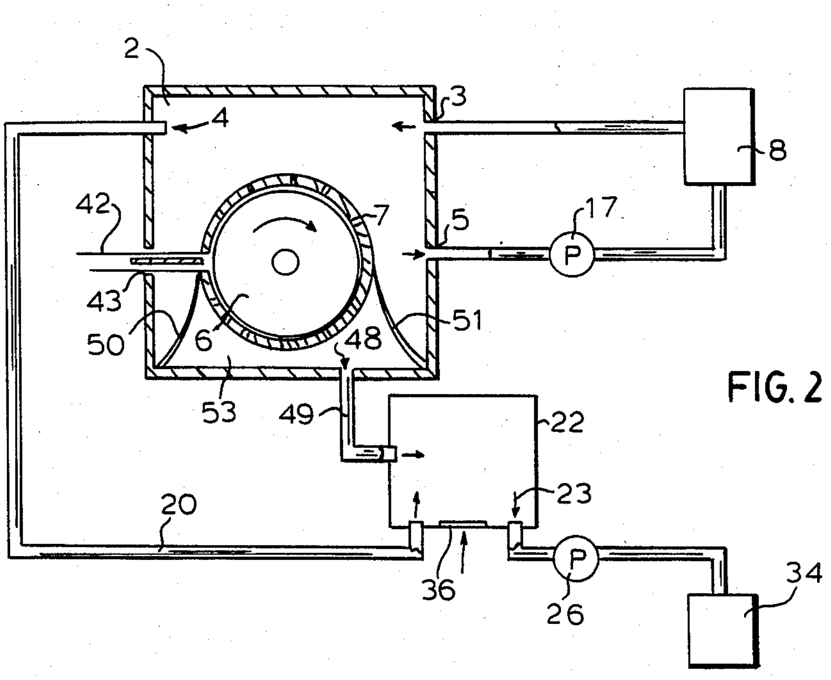
FIG. 2 is a schematic diagram of a preferred embodiment of the developing apparatus of the invention.

As shown in FIG. 2, a sealed fume collection chamber 53 is in open association with sleeve 7. The chamber 53 is sealed closed by sealing engagement of the flexible wiper seals 50, 51 with the respective sides of the sleeve 7. An outlet 48 is in open communication through conduit 49 with the interior of vacuum surge chamber 22.

In operation, a sheet of sensitized diazo-type paper material 42 is fed by suitable rollers into developing chamber 2 via opening 43 formed in one side thereof, and is transported in a path through developing chamber 2 by means of rotatable drum 6. Simultaneously with the entry of the sensitized paper 42 into the developing chamber 2, pump drive motor 27 is activated to commence the flow of ammonia gas into the developing chamber 2 for the development of the latent image contained on sensitized paper 42. Upon the actuation of motor 27, pump 17 raises the internal pressure of reservoir 8 to commence the circulation of anhydrous ammonia 10 through the developing chamber 2. A portion of such ammonia, together with any air which may be drawn into developing chamber 2 via paper opening 43 is discharged via the pressure side of pump 17 to reservoir 8.

Concurrently with this operation, pump 26 draws the ammonia-air mixture from developing chamber 2 through vacuum surge chamber 22 into the pump, and discharges such ammonia-air mixture via distributor 32 into the citric acid absorption solution contained in absorption vessel 34. The pump 26 also draws the ammonia-air mixture from the sealed chamber 53 through the vacuum surge chamber 22. We have discovered that the ammonia-gas mixture is carried on the sleeve 7 and collects in the chamber 53. By separate evacuation of the ammonia-gas mixture from the chamber 53 independent of the evacuation of the chamber 2, efficiency of the removal of the ammonia for ultimate disposal or recall is greatly increased. Pump 26 is adapted to remove a portion of the circulated gas as well as a portion of any air that might leak into the developing chamber. In this manner, the internal pressure of the developing chamber 2 is maintained at a level which is below atmospheric, and, thus, avoids any external leakage of ammonia fumes through opening 43. On the contrary, since the pressure within developing chamber 2 is maintained at sub-atmospheric there is a tendency for air to leak into such chamber, rather than ammonia fumes being discharged into the surrounding atmosphere.

Vacuum surge chamber 22 and control valve 36 are operative to maintain the sub-atmospheric internal pressure within developing chamber 2 and chamber 53 at a predetermined level, preferably between about 0.2 inches and about 1.0 inches of water column. If the pressure within the developing tank is reduced below such level, the differential pressure across control valve 36 is sufficient to overcome the biasing force of plate 37, so that disc 41 is lifted from opening 40 of surge chamber 22 to permit the entry therein of ambient atmospheric air to once again raise the sub-atmospheric internal pressure to the desired level, whereupon the biasing force of plate 37 overcomes the differential pressure and causes disc 41 to again sealably close opening 40.

It will be apparent to those skilled in the art that many modifications of the above-described embodiments may be made without departing from the spirit and the scope of the invention. For example, evacuation of the chamber 53 is not dependent upon vacuum draw into the surge chamber 22. This is only one means to carry the concentrated ammonia-gas from chamber 53 to a means of disposal or recycle. The chamber 53 may be evacuated through a conduit directly connected to an ammonia absorber under a greater vacuum or lower pressure, created by a separate pump. Also, vacuum could be obtained by connection of the chamber 53 with part 40 in the surge chamber 22. Other means of evacuating chamber 53 will be obvious to those skilled in the art.

What is claimed:

1. In a developing apparatus for photocopy machines comprising, in combination, a developing chamber having an inlet for receiving developing medium, an outlet for discharging said developing medium, means for transporting sensitized paper through the developing chamber and a vacuum pump in communication with the developing chamber to reduce the pressure within the developing chamber to a level below ambient pressure and thereby avoid external leakage of developing medium, the improvement which comprises:
  a sealed fume collection chamber positioned adjacent to and in open contact with the means for transporting the sensitized paper; and open conduit means connecting the sealed chamber to evacuate collected fumes.

2. A developing apparatus in accordance with claim 1, in which the developing chamber includes a second outlet; and said means for introducing developing medium comprises a reservoir containing developing medium; means communicating said reservoir and the inlet of the developing chamber, and a pump connected at its suction side to the second outlet of the developing chamber and connected at its output side to the reservoir to circulate developing medium between the reservoir and the developing chamber.

3. The apparatus of claim 1 wherein the means for transporting sensitized paper comprises a cylindrical drum.

4. A developing apparatus in accordance with claim 3, in which the vacuum pump and the circulating pump for the developing medium are both driven by a single electrical motor.

5. A developing apparatus in accordance with claim 1, in which the output of the vacuum pump is in communication with an absorption vessel containing suitable material to absorb the discharged developing medium.

6. A developing apparatus in accordance with claim 5, in which the developing medium is anhydrous ammonia and the absorption material is citric acid.

7. In a developing apparatus for photocopy machines comprising, in combination, a developing chamber having an inlet for receiving developing medium, an outlet for discharging said developing medium, and means for transporting sensitized paper through means for introducing developing medium into said developing chamber in controlled amounts via said inlet; and a vacuum pump in communication with said outlet to remove said developing medium from the developing chamber and to maintain the internal pressure of said developing chamber at below atmospheric, and thereby avoid external leakage of developing medium, the improvement which comprises:
  a sealed fume collection chamber positioned adjacent the developing chamber and in open contact with the means for transporting the sensitized paper; and an open conduit means connecting the sealed chamber to evacuate collected fumes.

8. In a developing apparatus for photocopy machines comprising, in combination, a developing chamber having an inlet for receiving developing medium, an outlet for discharging said developing medium, and means for transporting sensitized paper through the developing chamber; means for introducing developing medium into said developing chamber in controlled amounts via said inlet; and a vacuum pump in communication with said outlet to remove said developing medium from the developing chamber and to maintain the internal pressure of said developing chamber at below atmospheric, and thereby avoid external leakage of developing medium; and a vacuum surge chamber disposed in the line of flow from the outlet of the developing chamber to the inlet of the vacuum pump adapted to maintain a constant below atmosphere pressure within the developing chamber, the improvement which comprises:
  a sealed fume collection chamber positioned adjacent to and in open contact with the means for transporting the sensitized paper; and an open conduit means connecting the sealed chamber to means for disposal of developing medium.

9. A developing apparatus in accordance with claim 8, in which the vacuum surge chamber comprises a sealed tank having an inlet in communication with the outlet of the developing chamber, an outlet in communication with the suction side of said vacuum pump.

10. A developing apparatus in accordance with claim 9, in which the vacuum surge chamber maintains the below atmosphere pressure within the developing chamber at about 0.2 inches of water column to about 1.0 inches of water column.

11. In a developing apparatus for photocopy machines comprising, in combination, a developing chamber having an inlet for receiving developing medium, an outlet for discharging said developing medium, and means for transporting sensitized paper through the developing chamber; means for introducing developing medium into said developing chamber in controlled amounts via said inlet; and a vacuum pump in communication with said outlet to remove said developing medium from the developing chamber, and to maintain the internal pressure of said developing chamber at below atmospheric, and thereby avoid external leakage of developing medium, the output of the vacuum pump being in communication with a catalytic reactor to breakdown the discharged developing medium into its non-toxic components for exhausting into the surrounding atmosphere, the improvement which comprises:

a sealed fume collection chamber positioned adjacent to and in contact with the means for transporting the sensitized paper; and an open conduit means connecting the sealed zone to means for disposal of developing medium.

12. A developing apparatus in accordance with claim 11, in which the developing medium is anhydrous ammonia and the catalytic reactor breaks down such ammonia into nitrogen gas and water vapor.

13. In a developing apparatus for photocopy machines comprising, in combination, a developing chamber having an inlet for receiving developing medium, an outlet for discharging said developing medium, and means for transporting sensitized paper therethrough; means for introducing developing medium into said developing chamber in controlled amounts via said inlet; and a vacuum pump in communication with said outlet to remove said developing medium from the developing chamber; and to maintain the internal pressure of said developing chamber at below atmospheric, and thereby avoid external leakage of developing medium, said developing chamber including a second outlet; and said means for introducing developing medium comprising a reservoir containing developing medium; means communicating said reservoir and the inlet of the developing chamber; and a pump connected at its suction side to the second outlet of the developing chamber and connected at its output side to the reservoir to circulate developing medium between the reservoir and the developing chamber, said developing medium being anhydrous ammonia; the reservoir being sealed and containing a solution of aqueous ammonia and gaseous anhydrous ammonia disposed thereabove; and the output side of the pump being in communication with the reservoir at a point below the surface of the aqueous ammonia, whereby the gaseous ammonia entering the reservoir from the pump is bubbled through said aqueous ammonia to facilitate the dissolution of the aqueous ammonia and thereby generate additional quantities of anhydrous ammonia, and to raise the pressure within the reservoir above that of the developing chamber to facilitate circulation of ammonia between the reservoir and the developing chamber, the improvement which comprises:

a sealed fume collection chamber positioned adjacent to and in contact with the means for transporting the sensitized paper; and an open conduit means connecting the sealed zone to means for disposal of developing medium.

14. In a developing apparatus for diazo photocopy machines comprising, in combination, a developing chamber including transport means for advancing exposed diazo-type sensitized paper therethrough; means for introducing and circulating anhydrous ammonia within the chamber to develop an image on the sensitized paper, a vacuum pump for evacuating said anhydrous ammonia from the developing chamber; and a vacuum surge chamber disposed in the line of flow from the developing chamber to the vacuum pump to maintain the internal pressure of said developing chamber at below atmospheric to avoid external leakage of ammonia fumes; and said vacuum surge chamber being adapted to maintain said below atmospheric pressure within the developing chamber at a relatively constant level, the improvement which comprises:

a fume collection chamber adjacent to and in contact with the means for transporting the sensitized paper; and open conduit means connecting the sealed zone to means for disposal of developing medium.

15. In a developing apparatus for photocopy machines comprising, in combination, a developing chamber having an inlet for receiving developing medium, an outlet for discharging said developing medium, and means for transporting sensitized paper through said developing chamber; means for introducing developing medium into said developing chamber in controlled amounts via said inlet; a vacuum pump in communication with said outlet to remove said developing medium from the developing chamber, and means connected with said developing chamber maintaining the internal pressure of said developing chamber at lower than atmospheric pressure to thereby avoid external leakage of developing medium, the improvement which comprises;

a fume collection chamber adjacent to and in contact with the means for transporting the sensitized paper; and open conduit means connecting the sealed zone to means for disposal of developing medium.

* * * * *